(12) United States Patent
Winters

(10) Patent No.: US 12,433,791 B2
(45) Date of Patent: Oct. 7, 2025

(54) EYE SHIELD

(71) Applicant: Gentex Corporation, Simpson, PA (US)

(72) Inventor: Nathan Winters, Simpson, PA (US)

(73) Assignee: Gentex Corporation, Simpson, PA (US)

( * ) Notice: Subject to any disclaimer, the term of this patent is extended or adjusted under 35 U.S.C. 154(b) by 929 days.

(21) Appl. No.: 17/420,863

(22) PCT Filed: Jan. 7, 2020

(86) PCT No.: PCT/US2020/012566
§ 371 (c)(1),
(2) Date: Jul. 6, 2021

(87) PCT Pub. No.: WO2020/146374
PCT Pub. Date: Jul. 16, 2020

(65) Prior Publication Data
US 2022/0087866 A1    Mar. 24, 2022

Related U.S. Application Data

(60) Provisional application No. 62/789,647, filed on Jan. 8, 2019.

(51) Int. Cl.
*A61F 9/04*        (2006.01)
*A61F 9/02*        (2006.01)
(Continued)

(52) U.S. Cl.
CPC .............. *A61F 9/04* (2013.01); *A61F 9/029* (2013.01); *G02B 23/125* (2013.01); *G02B 23/18* (2013.01);
(Continued)

(58) Field of Classification Search
CPC .... A61F 9/02; A61F 9/04; A61F 9/026; A61F 9/029; A62B 18/18; A62B 18/082;
(Continued)

(56) References Cited

U.S. PATENT DOCUMENTS 2,986,969 A    6/1961  Muncheryan
3,553,686 A *  1/1971  O'Shea .................. G10K 1/063
                                                       340/392.1

(Continued)

FOREIGN PATENT DOCUMENTS

JP    2003315688 A  * 11/2003
JP    2009031381 A  *  2/2009
KR    101420775 B1  *  8/2014

OTHER PUBLICATIONS

Machine Translation of JP2009031381A (Year: 2009).*
(Continued)

*Primary Examiner* — Cara E Rakowski
(74) *Attorney, Agent, or Firm* — Morgan, Lewis & Bockius LLP

(57) ABSTRACT

An eye shield for protecting a user's eye has a shield that includes an aperture. The aperture has a first central axis, a medial side, and a lateral side, and a gasket that is coupled to the shield and disposed within the aperture. The gasket has a second central axis. The first central axis is at an oblique angle relative to the second central axis.

24 Claims, 8 Drawing Sheets

(51) Int. Cl.
    *G02B 23/12*     (2006.01)
    *G02B 23/18*     (2006.01)
    *G02C 7/08*     (2006.01)
    *G02C 7/16*     (2006.01)
    *G02C 11/00*     (2006.01)

(52) U.S. Cl.
    CPC ............... *G02C 7/088* (2013.01); *G02C 7/16* (2013.01); *G02C 11/12* (2013.01)

(58) Field of Classification Search
    CPC ........ G02B 23/125; G02B 23/18; G02C 7/16; G02C 11/12; G02C 5/003; G02C 5/005; G02C 7/088; F41H 5/06; A41D 12/11; A41D 12/1184; G03B 11/046
    USPC ............................... 359/600; 2/426; D16/319
    See application file for complete search history.

(56) References Cited

U.S. PATENT DOCUMENTS

| | | | | |
|---|---|---|---|---|
| 4,429,959 A | * | 2/1984 | Walters | G02C 7/088 |
| | | | | 351/158 |
| 4,729,648 A | * | 3/1988 | Armstrong | G02B 23/16 |
| | | | | 348/373 |
| 6,338,557 B1 | * | 1/2002 | Grendelmeier | G02C 7/088 |
| | | | | 351/158 |
| 6,345,982 B1 | * | 2/2002 | Meyer | A61C 1/16 |
| | | | | 433/141 |
| 6,637,877 B1 | | 10/2003 | Hartley et al. | |
| 6,830,331 B2 | | 12/2004 | Jojiki et al. | |
| 7,542,204 B2 | | 6/2009 | Fante et al. | |
| 8,922,920 B2 | * | 12/2014 | Mace | G02B 7/006 |
| | | | | 433/29 |
| 9,470,908 B1 | | 10/2016 | Frankel et al. | |
| 10,061,115 B2 | | 8/2018 | Feinbloom et al. | |
| 2004/0017539 A1 | * | 1/2004 | Nagata | G02C 7/088 |
| | | | | 351/57 |
| 2004/0125444 A1 | | 7/2004 | Caplan et al. | |
| 2007/0103796 A1 | * | 5/2007 | Floyd | G02B 23/12 |
| | | | | 359/811 |
| 2012/0033282 A1 | | 2/2012 | Immel | |
| 2018/0136489 A1 | | 5/2018 | Hellstöm | |

OTHER PUBLICATIONS

Machine translation of KR101420775B1 retrieved electronically from PE2E Search Feb. 27, 2025 (Year: 2025).*

Machine translation of JP 2003315688 A retrieved electronically from PE2E Search Feb. 27, 2025 (Year: 2025).*

International Search Report and Written Opinion dated Jun. 12, 2020 for International Patent Application No. PCT/US2020/012566, 9 pages.

* cited by examiner

EYE SHIELD

CROSS-REFERENCE TO RELATED APPLICATIONS

This application is a U.S. National Phase Patent Application of International Patent Application No. PCT/US2020/012566 filed Jan. 7, 2020, which claims the benefit of U.S. Provisional Patent Application No. 62/789,647 filed Jan. 8, 2019 entitled "Eye Shield", each of which is incorporated by reference herein in its entirety.

FIELD OF THE INVENTION

The present invention generally relates to an eye shield for use with an optical device and, more particularly in some embodiments, to a pair of eye shields for use with night vision goggles (NVG).

BACKGROUND OF THE INVENTION

Optical devices for enhancing or augmenting a user's vision are used in different environments and for many different purposes. Accessories may be added to the optical devices to aid the user in achieving certain tasks. For example, such accessories may provide additional eye protection to the user.

During use, various optical elements may enhance the vision of the user during activities such as operation of vehicles or during military engagement. For example, optical devices, such as night vision goggles, are used by many individuals in the military to accomplish certain tasks and objectives at night. These optical devices may include head mounted devices. For example, an optical device, such as night vision goggles, may be mounted to a helmet to assist a user in accomplishing tasks during the night or during low light. In some situations, such as military engagement, the use of eye protection is desired to protect the user's eyes from debris and/or light/lasers.

Current eye protection methods include standard safety goggles. However, safety goggles in conjunction with the use of optical devices and night vision goggles do not provide adequate visibility. For example, wearing standard safety goggles behind night vision goggles is not ideal as the user's perception is affected or may be impaired. Further, when utilizing standard safety goggles, the eyepiece of the night vision goggles is further from the user's eye, thereby affecting their vision through the night vision goggles. Other methods of protecting a user's eyes when using optical devices include the use of standard rubber eyecups around the eyepiece of the night vision goggles. These standard rubber eyecups allow the night vision goggles to be closer to the eye of the user; however they do not allow for peripheral vision and may not provide adequate protection against ballistics and debris.

BRIEF SUMMARY OF THE INVENTION

Embodiments of the present invention are directed to an eye shield configured to couple to an optical device and shield the user's eye from debris and/or light. The eye shield may include a shield having an aperture, the aperture having a first central axis, a medial side, and a lateral side, and a gasket coupled to the shield and disposed within the aperture, the gasket having a second central axis, wherein the first central axis may be at an oblique angle relative to the second central axis.

In some embodiments, the gasket may be compression fit within the aperture. Further, the gasket may include a tab extending radially from the gasket and disposed proximate to the medial side of the aperture. The tab of the gasket may be disposed on a rear side of the gasket and may include at least one ridge disposed on a surface of the tab.

In some embodiments, the tab may be configured to be pushed by a user to move the second central axis toward alignment with the first central axis to remove the gasket from an eyepiece of a night vision goggle.

In some embodiments, the gasket and the shield may be composed of different materials. Further, the shield may be comprised of a resilient plastic and the gasket may be comprised of an elastomeric material.

In some embodiments, the shield may extend further from the lateral side of the aperture than the medial side of the aperture.

In some embodiments, the gasket may include a first side and a second side, the first side being proximate the medial side of the aperture and the second side being proximate the lateral side of the aperture. Further, the gasket may include a front end and a rear end, the front end being proximate the lateral side of the aperture and the rear end being proximate the lateral side of the aperture. The gasket may include a groove at least partially circumferentially disposed around the gasket.

In some embodiments, a portion of the shield that extends from the lateral side of the aperture may curve convexly toward the first central axis. Further, the shield may be optically transparent.

In some embodiments, the gasket may extend through both sides of the aperture.

In some embodiments, the gasket may be configured to receive an eyepiece of an optical device, the optical device including one of night vision goggles, binoculars, monocular, scopes, spectacles, augmented reality displays, virtual reality displays, display devices, or cameras.

In some embodiments, a diameter of a front end and a diameter of a rear end may be smaller than a central diameter of the gasket.

In some embodiments, a diameter of the aperture may be greater than all inner diameters of the gasket.

Another embodiment of the present invention may provide an eye shield that may include a shield having an aperture, the aperture having a first central axis, a medial side, and a lateral side, wherein a portion of the shield extends further from the lateral side of the aperture than the medial side of the aperture and curves convexly toward the first central axis, and a gasket coupled to the shield and disposed within the aperture, the gasket having a second central axis, wherein the gasket includes a tab configured to be pushed by a user to move the second central axis toward alignment with the first central axis to remove the gasket from an eyepiece of an optical device, wherein the first central axis is at an oblique angle relative to the second central axis.

Another embodiment of the present invention may provide eye shield that may include a shield including an aperture, the aperture having a first central axis, a medial side, and a lateral side and a gasket coupled to the shield and comprised of a different material than the shield, the gasket being compression fit within the aperture and having a second central axis at an oblique angle relative to the first central axis, a groove at least partially circumferentially disposed around the gasket, and a tab extending radially from the gasket, the tab disposed proximate to the medial side of the aperture. The gasket may further include a front end and a rear end, the front end being proximate the lateral side of the aperture and the rear end being proximate the lateral side of the aperture, wherein a diameter of the front end and a diameter of the rear end are smaller than a central diameter of the gasket and a diameter of the aperture is greater than all inner diameters of the gasket.

BRIEF DESCRIPTION OF THE SEVERAL VIEWS OF THE DRAWINGS

The foregoing summary, as well as the following detailed description of embodiments of the eye shield, will be better understood when read in conjunction with the appended drawings of an exemplary embodiment. It should be understood, however, that the invention is not limited to the precise arrangements and instrumentalities shown.

DETAILED DESCRIPTION OF THE EXEMPLARY EMBODIMENTS OF THE INVENTION

Figure 1:
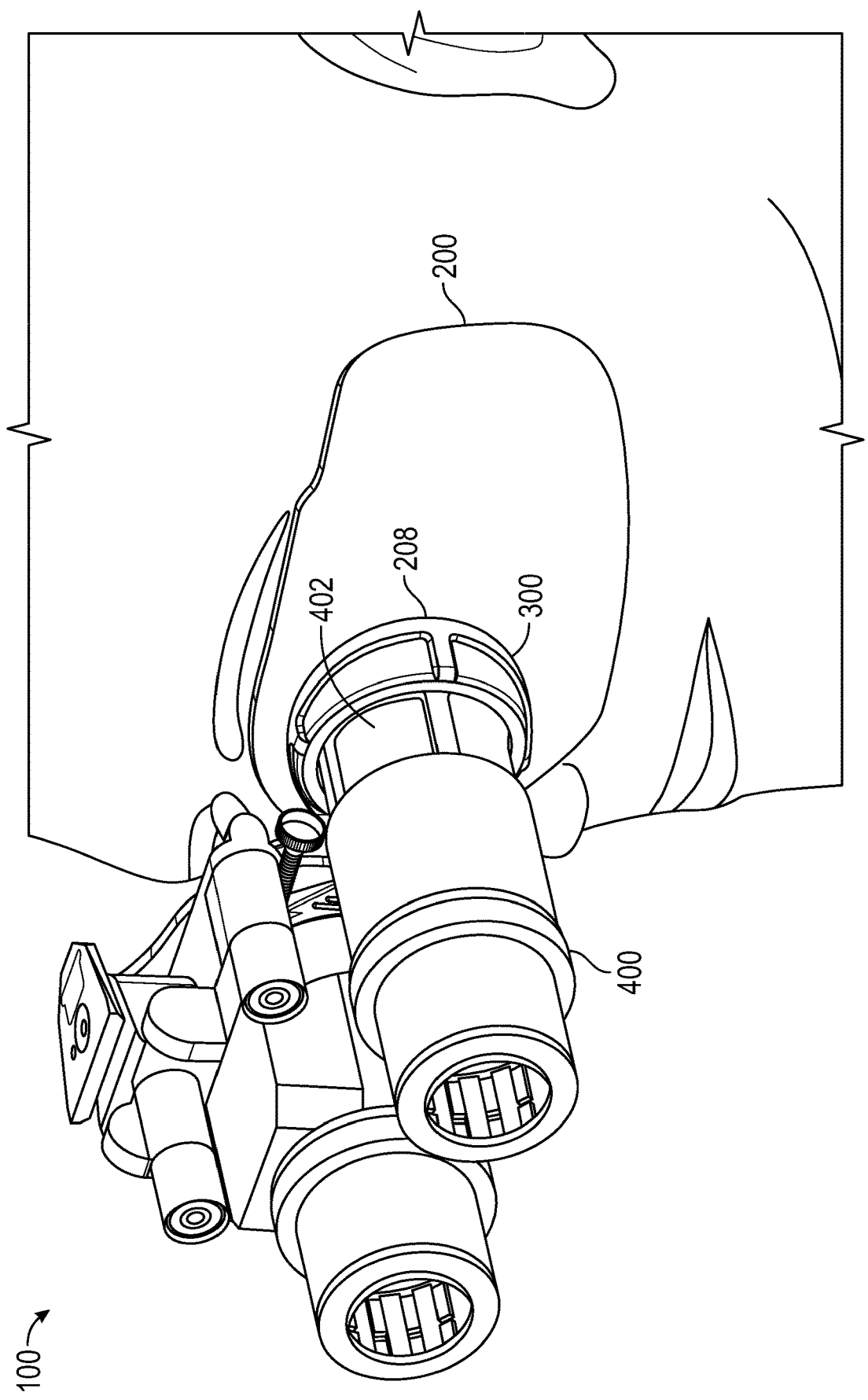
FIG. 1 is a perspective view of an in accordance with an exemplary embodiment of the present invention shown in use mounted to an optical device.

Referring to the drawings in detail, wherein like reference numerals indicate like elements throughout, there is shown in FIGS. 1-12 an eye shield, generally designated 100, an exemplary embodiment of the present invention. Various embodiments of eye shield 100 are described in further detail below in reference to the exemplary embodiment shown in the figures.

In use, eye shield 100 may couple to an optical device 400, such as night vision goggles, binoculars, monocular, scopes, spectacles, augmented reality displays, virtual reality displays, display devices, and/or cameras, to protect a user's eye(s) from ballistics, projectiles, and other debris and/or light. Specifically, eye shield 100 may be coupled to optical device 400 and allow for the securement of optical device 400 to shield 200 in addition to protection of the user's eyes and surrounding areas. Eye shield 100 may extend radially outwardly from the viewing area of optical device 400 to provide protection from ballistics and debris as well as block out or reduce distracting light, lasers, and/or glare. For example, eye shield 100 may extend laterally from optical device 400, away from the user's eyes and nose, and curve toward the user's temple to prevent debris from entering the user's eye peripherally and from the side. Further, eye shield 100 may provide for an improved method of securing eye shield 100 to optical device 400, preventing eye shield 100 from becoming detached from optical device 400 during activity, while also providing the necessary protection to the user's eyes.

Figure 2:
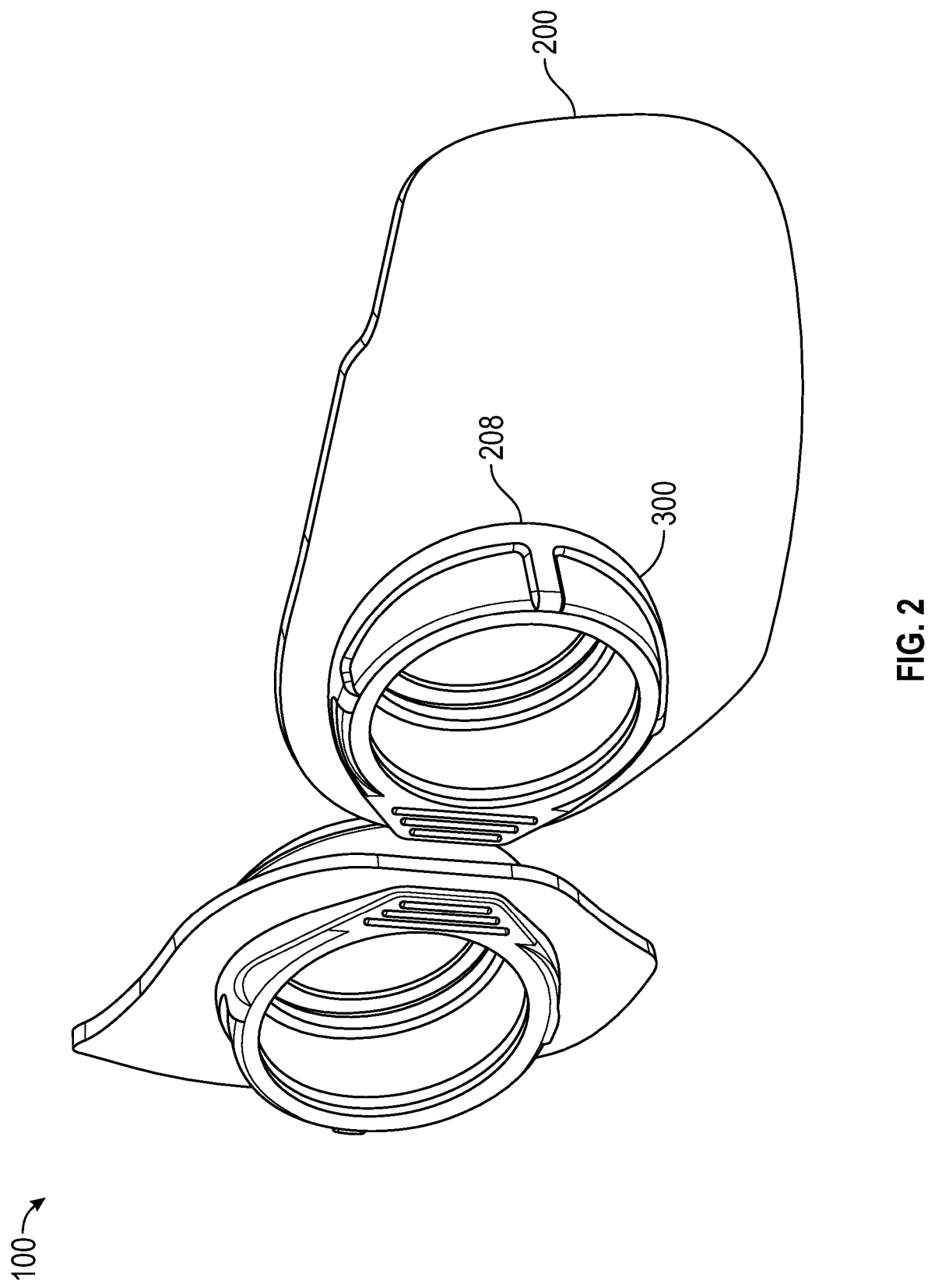
FIG. 2 is a perspective view of the eye shield of FIG. 1.
Figure 3:
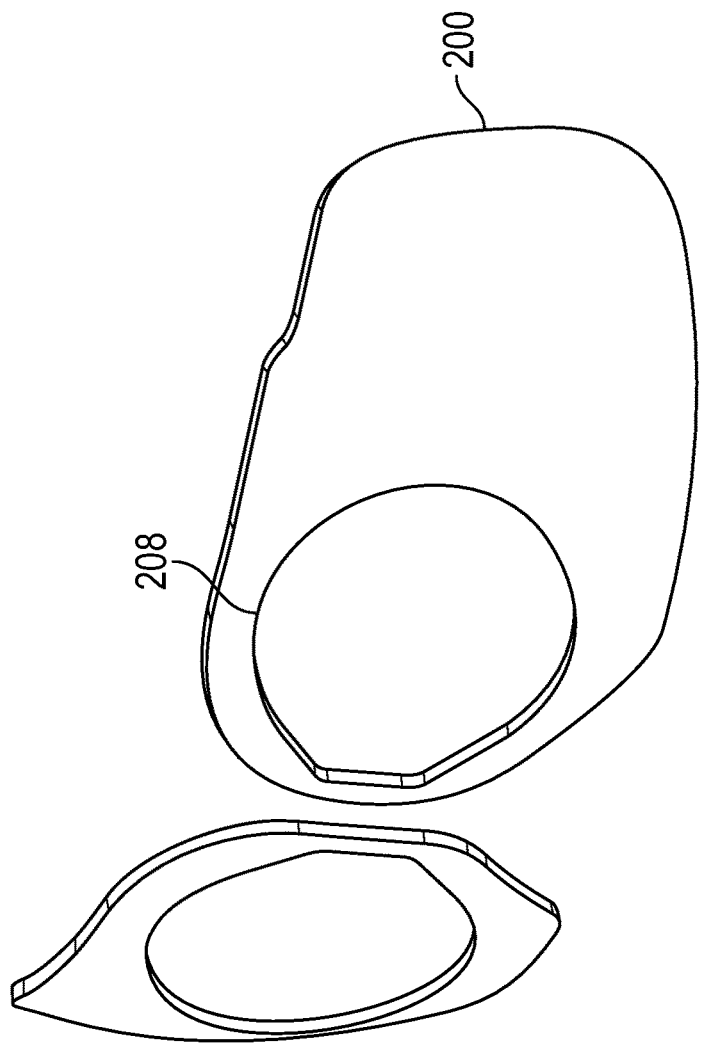
FIG. 3 is an exploded view of the eye shield of FIG. 1.
Figure 3:
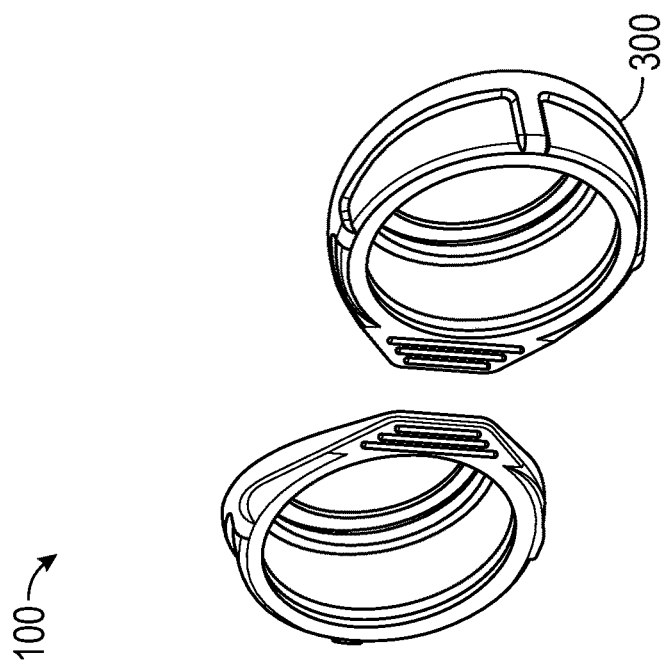

Referring to FIGS. 1-3, eye shield 100 may include shield 200 and gasket 300. Shield 200 may include aperture 208, and gasket 300 may be disposed within aperture 208. Gasket 300 may be configured to secure shield 200 to eyepiece 402 of optical device 400. For example, optical device 400 may be night vision goggles (also referred to as "NVG") and shield 200 may be secured to eyepiece 402 of the night vision goggles via gasket 300. In one embodiment, optical device 400 is the BNVD-1531 night vision goggle. However, eye shield 100 may be used with other types of night vision goggles. Further, the night vision goggles may be pivotally coupled to a helmet (not shown) to allow for easy retrieval and removal from the user's line of sight. In some embodiments, more than one eye shield 100 may be provided. For example, a pair of eye shields 100 may be provided for each eyepiece 402 of optical device 400, which may include more than one eyepiece 402. Each eye shield 100 may be coupled separately to a corresponding eyepiece 402.

In one embodiment, a kit is provided which includes multiple eye shields 100. Extra eye shields 100, extra shields 200, and/or gaskets 300, may be provided to be used with multiple optical devices 400, for different sized optical devices 400, different applications (e.g., more or less optically transparent shield 200), or as replacements due to eye shield 100 being damaged or lost. Further, eye shield 100 may be provided in a set or as a pair. For example, the pair of eye shields 100 may be mirror images of each other so that they may be used with each eyepiece 402 of optical device 400. The pair of eye shields 100 may be mirror images along the medial plane, i.e. the central line, of optical device 400. However, the pair of eye shields 100 may be each shaped differently. For example, one eye shield 100 of the pair may be notched to allow a firearm to contact the right side of a user's face, e.g., the cheek of a user, while sighting a target. In another embodiment, eye shield 100 may be provided individually to be used with optical device 400 that may include only one eyepiece 402. For example, eye shield 100 may be used with a scope coupled to a firearm.

Referring to FIGS. 1-3, shield 200 may be used to protect the eyes and surrounding area of a user from various debris, projectiles, and/or ballistics. Shield 200 may extend to cover a substantial portion of a user's face surrounding their eyes. In one embodiment, shield 200 may be tapered laterally, away from the user's eyes and nose. For example, shield 200 may taper towards the temple of the user. However, shield 200 may not have any taper or may taper towards the user's eyes and nose. Shield 200 may be frameless as shown in FIGS. 1-3. However, in some embodiments, shield 200 includes a frame around the periphery of shield 200. Shield 200 may have an overall width of approximately 4.25 inches, an overall height of approximately 2.75, and a thickness of approximately 0.0625 inches. However, shield 200, may have a width between approximately 2 inches and 6 inches, between approximately 3 inches and 5 inches, greater than 6 inches, or less than 2 inches. Shield 200 may have an overall height between approximately 0.5 inches and 6 inches, between approximately 2 inches and 5 inches, greater than 6 inches, or less than 0.5 inches. Shield 200 may have a thickness between approximately 0.005 inches and 2 inches, between approximately 0.05 inches and 1.5 inches, greater than 2 inches, or less than 0.005 inches.

In one embodiment, shield 200 limits the amount a user's field of vision is exposed outside of the viewing area of optical device 400. For example, shield 200 may be at least partially opaque thereby limiting the amount a user is able to peripherally view. However, shield 200 may be fully transparent to allow a user to have complete field of view, including peripheral view. In one embodiment, shield 200 may be configured to provide notifications such has lights or a display to selectively provide information to a user. In one embodiment, shield 200 is comprised of a resilient material, such as plastic. For example, shield 200 may be made of a polycarbonate material. However, shield 200 may be comprised of other materials such as metal, steel, polymers, or any other material desired. In one embodiment, shield 200 is comprised of a lightweight material that is also resilient. Shield 200 may be cut from a larger molded blank and may include the use of laser protective dyes and coatings, light reducing and reflecting dyes and coatings, and integration with anti-scratch, anti-fog, and/or anti-smudge coatings.

Figure 5:
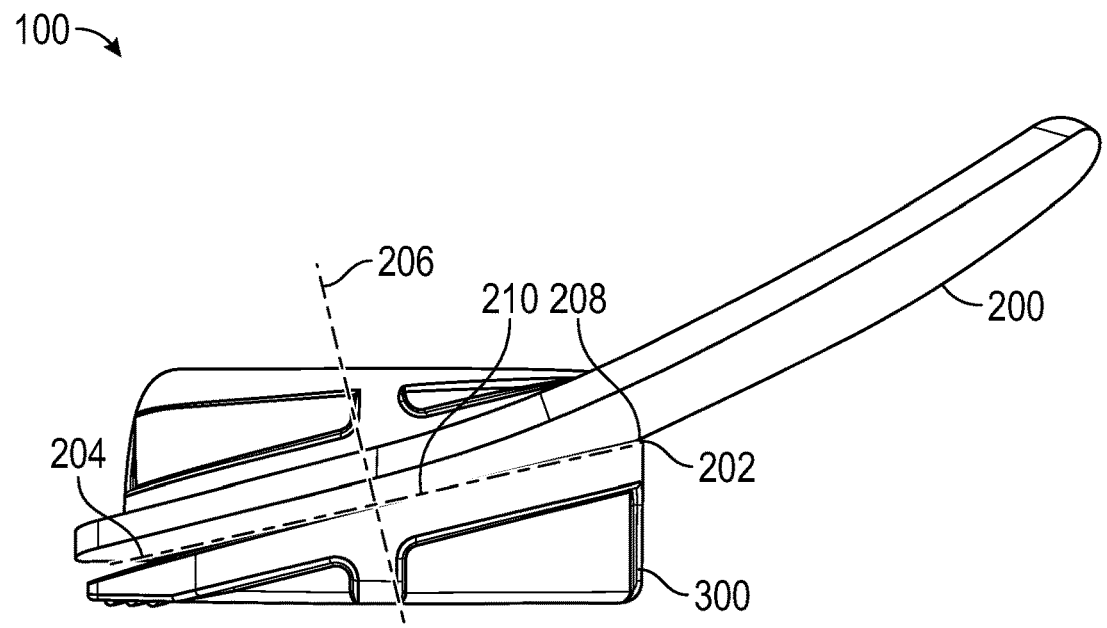
FIG. 5 is a side view of the eye shield of FIG. 1.
Figure 6:
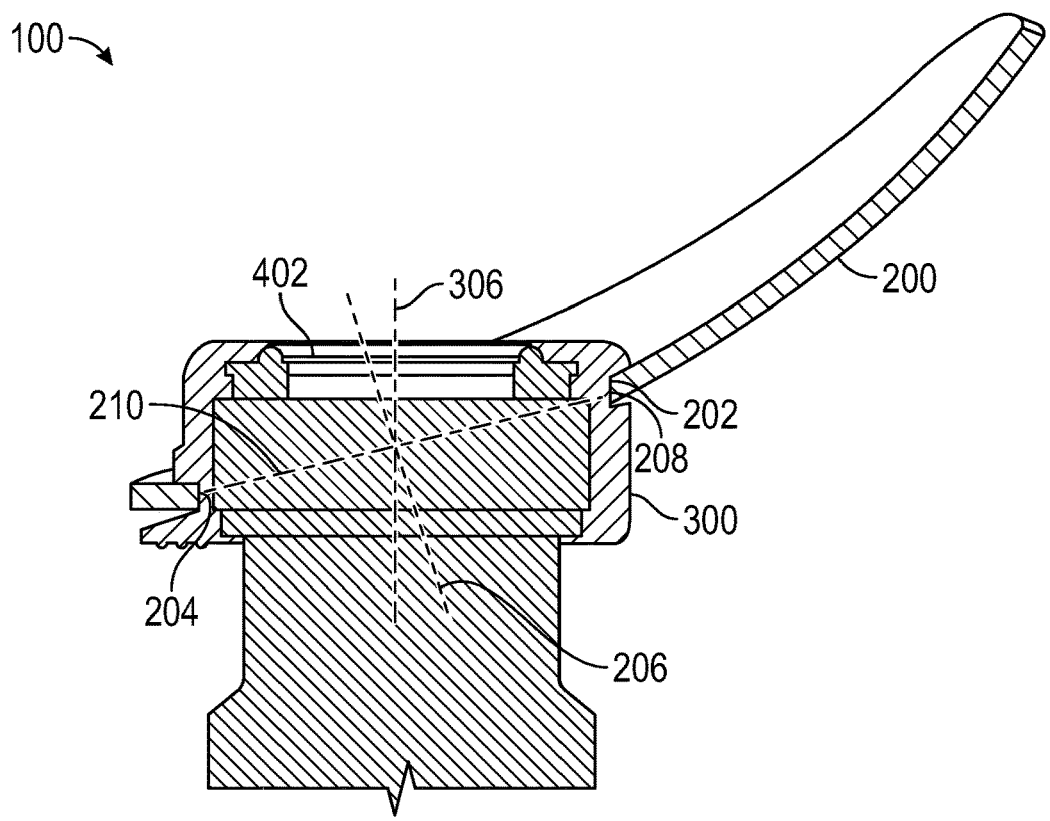
FIG. 6 is a cross-sectional side view of the eye shield of FIG. 5.

Referring to FIGS. 5 and 6, shield 200 may include aperture 208, which may include lateral side 202, medial side 204, first central axis 206, and inner diameter 210. In one embodiment, medial refers to the side closest to the sagittal or longitudinal plane of the user when in use, and lateral refers to the side furthest from the sagittal or longitudinal plane of the user when in use. Shield 200 may extend away from aperture 208. In one embodiment, shield 200 extends further away from lateral side 202 of aperture 208 than medial side 204 of aperture 208. Timer diameter 210 may extend from medial side 204 to lateral side 202. Inner diameter 210 may be between approximately 0.5 inches and approximately 4 inches, between approximately 1 inches and approximately 2 inches, greater than 4 inches, or less than 0.5 inches. For example, inner diameter 210 may be approximately 1.7 inches. Aperture 208 may include first central axis 208, which may be perpendicular to inner diameter 210. In one embodiment, aperture 208 may be approximately circular in shape. However, aperture 208 may be other shapes, such as oval, square, rectangle, or triangle. Aperture 208 may be cut within shield 200 perpendicular to a surface of shield 200 by standard machining means, such as a Computer Numeric Controlled (CNC) end mill. Aperture 208 may be cut within shield 200 such that the edge of aperture 208 is parallel to optical device 400.

In one embodiment, a portion of shield 200 extending from lateral side 202 of aperture 208 may curve convexly toward first central axis 206. However, in another embodiment, a portion of shield 200 extending from lateral side 202 curves concavely toward first central axis 206. In one embodiment, shield 200 is toric in shape. For example, shield 200 may have a first curve from medial side 204 to lateral side 202 and a second curve from the top to the bottom, where the first curve and the second curve are different. In one embodiment, the second curve is greater than the first curve. Shield 200 may have a horizontal radius of curvature between approximately 0.25 inches and approximately 6 inches, between approximately 1 inch and approximately 5 inches, between approximately 1.5 inches and approximately 4 inches, greater than 6 inches, or less than 0.25 inches. For example, shield 200 may have a horizontal radius of curvature of approximately 3.25 inches. Further, shield 200 may have a vertical radius of curvature between approximately 0.25 inches and approximately 10 inches, between approximately 1 inch and approximately 8 inches, between approximately 3 inches and approximately 6 inches, greater than 10 inches, or less than 0.25 inches. For example, shield 200 may have a vertical radius of curvature of approximately 5 inches.

In a preferred embodiment, shield 200 is optically transparent. However, shield 200 may have any level of transparency. For example, shield 200 may be semi-transparent or may be optically opaque. In an embodiment, the transparency of shield 200 is altered by varying the base material of shield 200 and/or by adding color/laser absorptive dies. The addition of additional dies may increase the thickness of shield 200. Further, absorptive and reflective coatings may be used on shield 200 to alter the transparency of shield 200.

Figure 7:
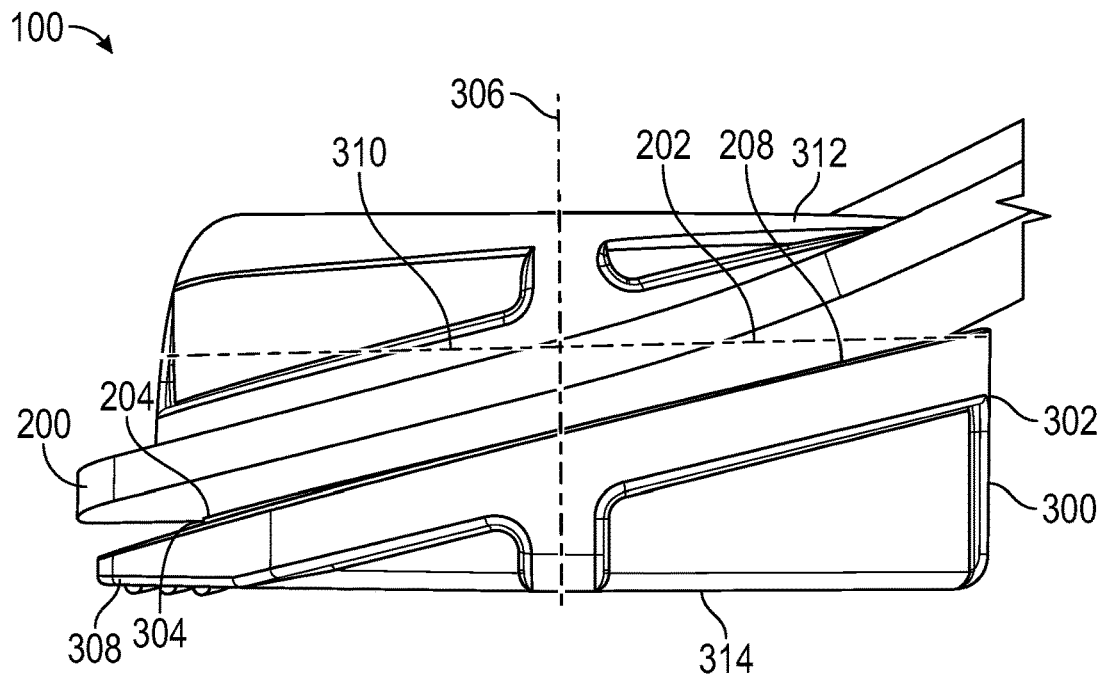
FIG. 7 is an enlarged partial side view of the eye shield shown in FIG. 1.
Figure 8:
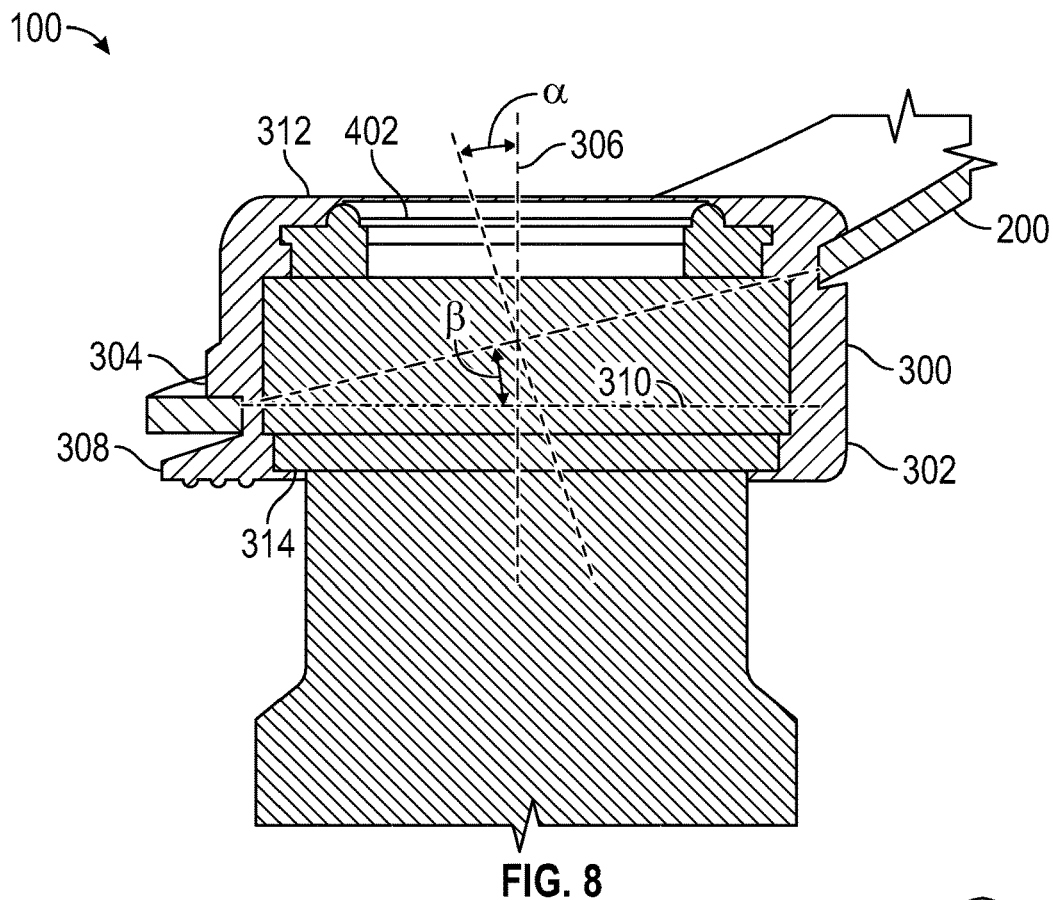
FIG. 8 is an enlarged partial cross-sectional side view of the eye shield shown in FIG. 7.

Referring to FIGS. 7 and 8, shield 200 may include gasket 300, which may be coupled to shield 200 and may be disposed within aperture 208. Gasket 300 may include first side 302, second side 304, second central axis 306, central diameter 310, front end 312, and rear end 314. Gasket 300 may have a depth of between approximately 0.25 inches and approximately 4 inches, between approximately 1 inch and approximately 3 inches, greater than 4 inches, or less than 0.25 inches. Gasket 300 may have a thickness between approximately 0.005 inches and approximately 2 inches, between approximately 0.05 inches and approximately 1 inch, greater than 2 inches, or less than 0.005 inches. For example, gasket may have a depth of approximately 0.75 inches and may be approximately 0.125 inches thick. Gasket 200 may be configured to receive eyepiece 402 of optical device 400 and may be disposed within aperture 208 to secure shield 200 to eyepiece 402. In one embodiment, gasket 300 is flexible to be placed within aperture 208 and to form a tight and secure fit around eyepiece 402, thereby allowing for the mounting and removal of shield 200 from optical device 400. For example, gasket 300 may be made of an elastomeric material, such as rubber, to allow for flexibility of gasket 300. However, gasket 300 may be made from any other type of flexible material. In practice, gasket 300 may be flexible and circular in shape to be disposed within aperture 208 of shield 200, and may further be configured receive eyepiece 402 of optical device 400. For example, gasket 300 may be shaped and sized to securely fit within aperture 208 of shield 200 to securely hold eyepiece 402.

In one embodiment, gasket 300 and shield 200 are made out of different materials. For example, gasket 300 may be comprised of an elastic material to allow for flexibility, whereas shield 200 may be comprised of a generally inelastic material. Due to the different materials of shield 200 and gasket 300, central diameter 310 of gasket 300 may change and/or flex during movement or adjustment of gasket 300, whereas inner diameter 210 of aperture 208 of shield 200 may not change during movement or adjustment of shield 200. Flexing of gasket 300 may result in central diameter 310 changing size. For example, central diameter 310 may be smaller than the central diameter of gasket 300 when gasket 300 is not disposed within aperture 208 of shield 200, due to aperture 208 of shield 200 compressing the central diameter of gasket 300. However, flexing of shield 200 may not substantially change inner diameter 210 of aperture 208, due to shield 200 being comprised of a generally inelastic material. In yet another example, when gasket 300 is removed from aperture 208 of shield 200, central diameter 310 of gasket 300 may be changed due to the pivoting and manipulating of gasket 300 during removal, and the flexibility of gasket 300. However, inner diameter 210 of aperture 208 may not be substantially affected when gasket 300 is removed. In other embodiments, gasket 300 and shield 200 may be made out of the same material.

Referring to FIGS. 7-10, first side 302 of gasket 300 may be proximate to lateral side 202 of aperture 208 of shield 200, and second side 304 of gasket 300 may be proximate to medial side 204 of aperture 208 of shield 200 when in use. In one embodiment, front end 312 is proximate to lateral side 202 of aperture 208 while rear end 314 is proximate to medial end 204 of aperture 208 when in use. Referring to FIG. 6, front end 312 of gasket 300 may include diameter $D_1$ and rear end 314 of gasket 300 may include diameter $D_2$. Diameter $D_1$ of front end 312 and diameter $D_2$ of rear end 314 may be sized to fit and secure gasket 300 to eyepiece 402 of optical device 400. For example, diameter $D_1$ of front end 312 and diameter $D_2$ of rear end 314 may be smaller than central diameter 310 of gasket 300. As shown in FIG. 6, diameter $D_1$ and diameter $D_2$ may be smaller than central diameter 310 to fit and secure eyepiece 402 within gasket 300. In one embodiment, gasket 300 may include additional inner diameters to contour to the shape of eyepiece 402 of optical device 400. For example, gasket 300 may include ridges disposed along an inner circumference of gasket 300. Further, central diameter 310 may be the maximum inner diameter of gasket 300. Central diameter 310 may be between approximately 0.5 inches and approximately 4 inches, between approximately 1 inch and approximately 3 inches, greater than 4 inches, or less than 0.5 inches. For example, central diameter 310 may be approximately 1.5 inches. In an embodiment, inner diameter 210 of aperture 208 may be greater than all inner diameters of gasket 300. Inner diameter 210 may be between approximately 0.5 inches and approximately 4 inches, between approximately 1 inch and approximately 3 inches, greater than 4 inches, or less than 0.5 inches. $D_1$ and $D_2$ may be approximately 0.5 inches and approximately 4 inches, between approximately 1 inch and approximately 3 inches, greater than 4 inches, or less than 0.5 inches. For example, inner diameter 210 may be approximately 1.7 inches, whereas $D_1$ may be less than approximately 1.4 inches and $D_2$ may be approximately 1.5 inches.

Figure 9:
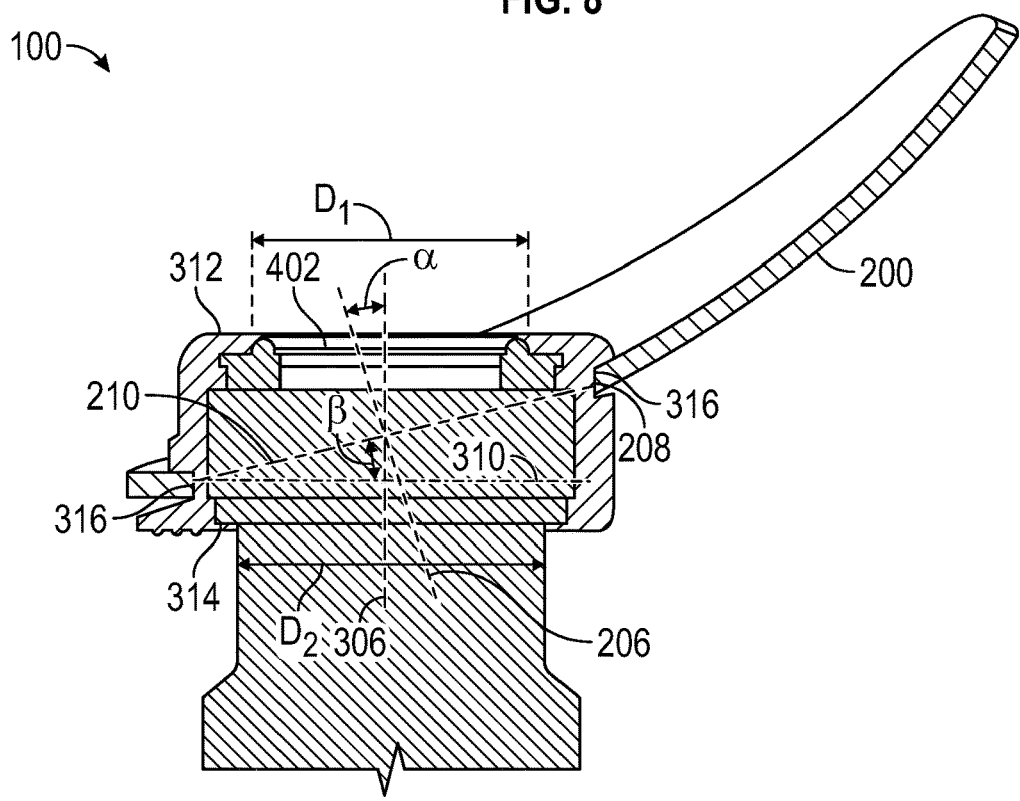
FIG. 9 is a cross-sectional side view of the eye shield of FIG. 1.
Figure 10:
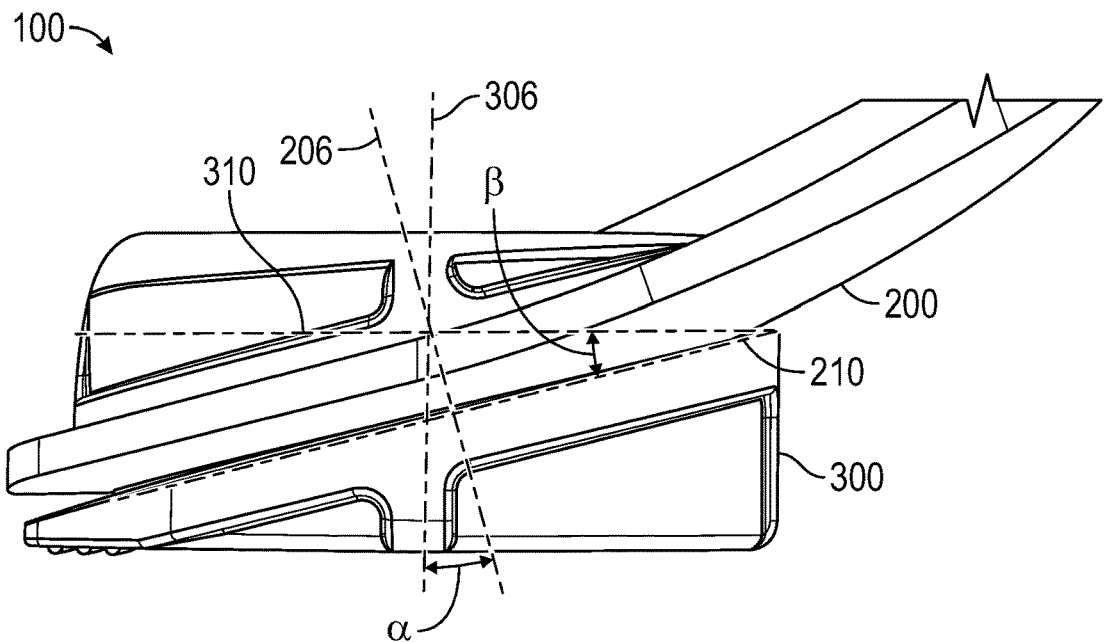
FIG. 10 is a side view of the eye shield of FIG. 1.

Referring to FIG. 9, gasket 300 may include groove 316. Groove 316 may be at least partially circumferentially disposed around gasket 300. For example, groove 316 of gasket 300 may be disposed around the entirety of the circumference of gasket 300. However, groove 316 of gasket 300 may be partially disposed around the circumference of gasket 300 such as small slots or a series of grooves. Medial side 204 and lateral side 202 of aperture 208 may be disposed within groove 316 of gasket 300 to secure gasket 300 into aperture 208 of shield 200.

Figure 4:
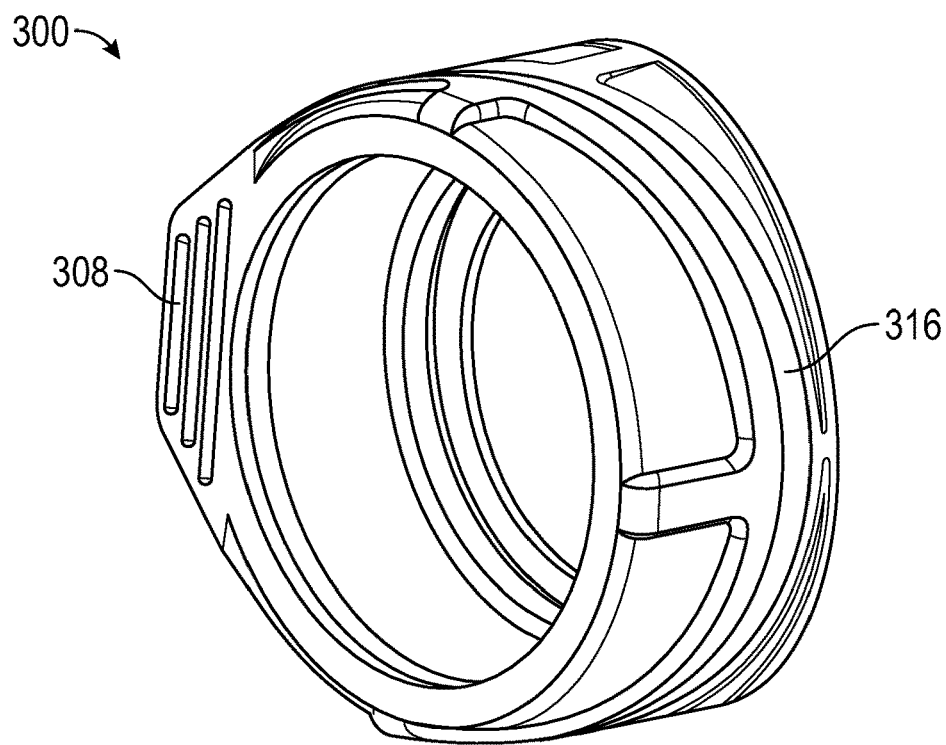
FIG. 4 is a perspective view of the gasket of the eye shield of FIG. 1.

In one embodiment, gasket 300 may be compression fit within aperture 208. Groove 316 of gasket 300 may be compression fit to be secured within aperture 208 and allow a user to adjust the rotational angle of eye shield 100 to make up for eye location adjustments made on optical device 400. In practice, some optical devices 400, such as some night vision goggles, translate eyepiece 402 linearly to adjust for varying eye widths, while some rotate the optical tube of optical device 400 to adjust for varying the eye widths. Referring to FIGS. 4 and 5, gasket 300 may extend beyond medial side 204 and lateral side 202 of aperture 208. In use, gasket 300 may be configured to receive eyepiece 402 of optical device 400.

Referring to FIGS. 8-11, first central axis 206 of aperture 208 may be at an angle α relative to second central axis 306. First central axis 206 may be offset by angle α from second central axis 306 to better secure gasket 300 to eyepiece 402. For example, when first central axis 206 is offset from second central axis 306 by angle α, the forces acting upon optical device 400 by gasket 300 and aperture 208, to secure gasket 300 to shield 200, are greater than when first central axis 206 is aligned with second central axis 306. The increase in force may assist in securing eyepiece 402 of optical device 400 to shield 200. In one embodiment, angle α may be an oblique angle. For example, angle α may be an acute angle, such as an angle between 0.0° and 89.9° or an obtuse angle, such as an angle between 90.1° and 180.0°. In one embodiment, angle α is dependent on the curvature of shield 200 and the length of optical device 400. Angle α may be between approximately 5° and approximately 30°, between approximately 10° and approximately 25°, between approximately 15° and approximately 20°. For example, angle α may be approximately 15°. First central axis 206 being at an oblique angle to second central axis 306 allows gasket 300 to be securely fastened into aperture 208 of shield 200. Angle α being at an oblique angle between first central axis 206 of aperture 208 and second central axis 306 of gasket 300 may also help to increase the mechanical hold of eyepiece 402 within gasket 300 when eyepiece 402 is inserted into gasket 300.

Figure 11:
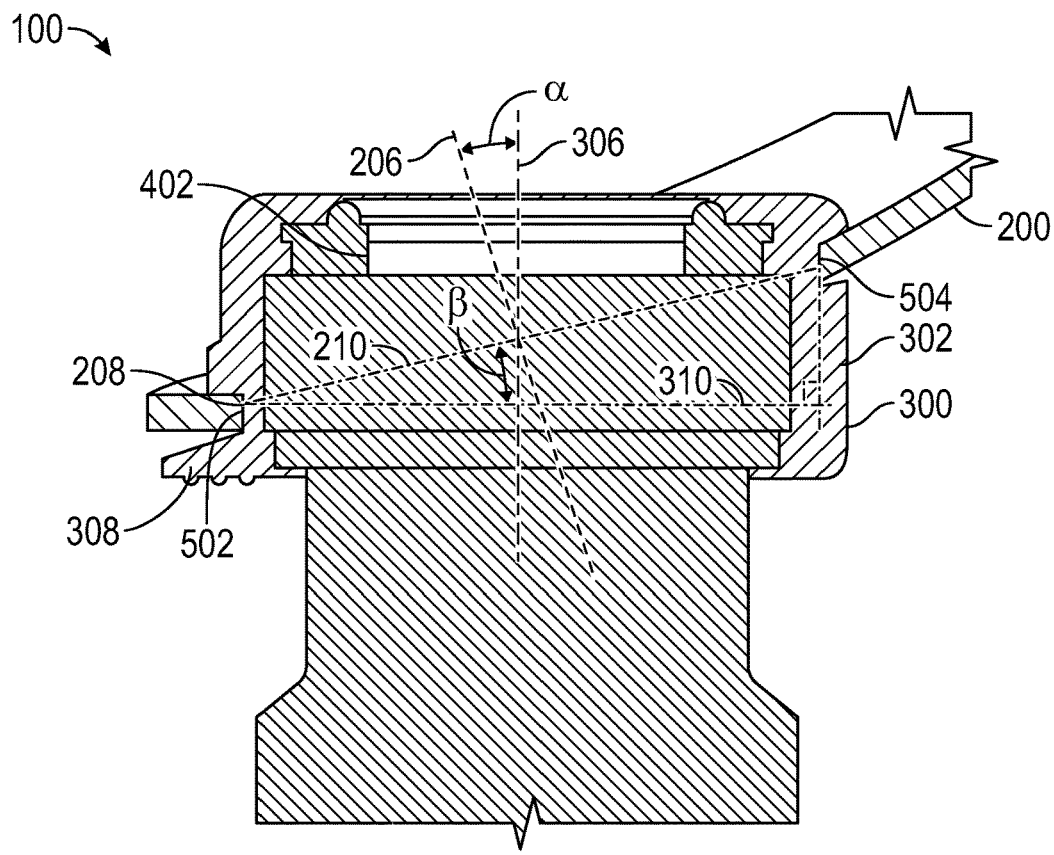
FIG. 11 is an enlarged partial cross-sectional side view of the eye shield of FIG. 1.

As shown in FIG. 11, gasket 300 may include contact points 502 and 504. Contacts points 502 and 504 may be points where gasket 300 contacts aperture 208 when first central axis 206 is offset from second central axis 306 by angle α. Inner 210 diameter may be disposed between contact points 502 and 504, which may be the hypotenuse of a right triangle, where the legs of the right triangle are central diameter 310 of gasket 300 and first side 302. As a result, inner diameter 210 must be greater than central diameter 310 of gasket 300. Thus, when gasket 300 is disposed within aperture 208 of shield 200 with first central axis 206 being offset from second central axis 306 by angle α, inner diameter 210 is larger than central diameter 310. As a result, gasket 300, coupled to eyepiece 402, becomes securely fit and wedged within aperture 208. For example, inner diameter 210 may be greater than central diameter 310 allowing gasket 300 to wedge into aperture 208 when first central axis 206 is offset from second central axis 306. The wedging of gasket 300 into aperture 208 results in gasket 300 being secured into aperture 208, and increases the mechanical hold of gasket 300 on eyepiece 402. This may make it more difficult to remove eyepiece 402 of optical device 400 from eye shield 100.

In contrast, if first central axis 206 was aligned with second central axis 306, then the widest portion of gasket 300 disposed within aperture 208 would be central diameter 310, which is less than inner diameter 210 of aperture 208, resulting in gasket 300 not being securely wedged within aperture 208. This results in the mechanical hold of gasket 300 within aperture 208 being weaker than when first central axis 206 is offset from second central axis 306 by angle α, thereby not providing a strong mechanical hold between gasket 300 and eyepiece 402.

Referring to FIGS. 8-11, inner diameter 210 of aperture 208 may be tilted relative to eyepiece 402 and central diameter 310. In one embodiment, inner diameter 210 is tilted at angle β relative to central diameter 310 of gasket 300. Angle β may be an oblique angle. For example, angle β may be an acute angle, such as an angle between 0° and 89.9° or an obtuse angle, such as an angle between 90.1° and 180°. In an embodiment, angle β is dependent on the curvature of shield 200 and the length of optical device 400. Angle β may be between approximately 5° and approximately 30°, between approximately 10° and approximately 25°, between approximately 15° and approximately 20°. For example, angle β may be approximately 15°. Similar to first central axis 206 being offset from second central axis 306 by angle α, inner diameter 210 of aperture 208 being tilted/offset from central dimeter 310 by angle β also assists in increasing the mechanical hold of eyepiece 402 to shield 200 via gasket 300. Further, angle α being an oblique angle between first central axis 206 and second central axis 306 allows shield 200 to be less rigidly mounted to eyepiece 402 of optical device 400. This results in improved flexibility of shield 200 during operation, preventing shield 200 from breaking during ballistics testing.

Referring to FIGS. 4, 7-8, and 11, gasket 300 may further include tab 308, which may be configured to be gripped by a user. Tab 308 may extend radially from gasket 300. In one embodiment, tab 308 may be disposed proximate to medial side 204. In a preferred embodiment, tab 308 is disposed on rear side 314 of gasket 300. In one embodiment, tab 308 includes at least one ridge disposed on a surface of tab 308 to provide a greater surface area to grip tab 308. The user may grip tab 308 between the user's thumb and a finger to assist the user with removing eye shield 100 from optical device 400. Specifically, tab 308 may assist the user with removing gasket 300 from eyepiece 402 of optical element 400. In practice, tab 308 may be configured to be manipulated by a user to move second central axis 306 toward alignment with first central axis 206, thereby assisting in the removal of gasket 300 from eyepiece 402 of optical device 400. For example, when removing gasket 300 using tab 308, a force may be applied to tab 308 resulting in second central axis 306 more closely aligning with first central axis 206, thereby decreasing angle α. Decreasing of angle α results in a decrease in the mechanical hold of gasket 300 on eyepiece 402 to assist in the removal of gasket 300 and shield 200 from optical device 400.

Referring to FIG. 11, the mechanical hold of gasket 300 on eyepiece 402 may be controlled by the positioning of shield 200 relative to eyepiece 402. The flexible material of gasket 300 may help facilitate how shield 200 is positioned relative to eyepiece 402 and may allow for eye shield 100 to securely attach to eyepiece 402 during use, yet still allow for easy attachment and detachment of eye shield 100 from eyepiece 402. As discussed above, by tilting inner diameter 210 of shield 200 relative to eyepiece 402, central diameter 310 of gasket 300 is decreased compared to the central diameter of gasket 300 when gasket 300 is not disposed within aperture 208. This results in gasket 300 and eyepiece 402 being wedged within aperture 208 when gasket 300 is coupled to eyepiece 402. This wedge force is designed to keep eye shield 100 coupled to eyepiece 402 during normal use.

Figure 12:
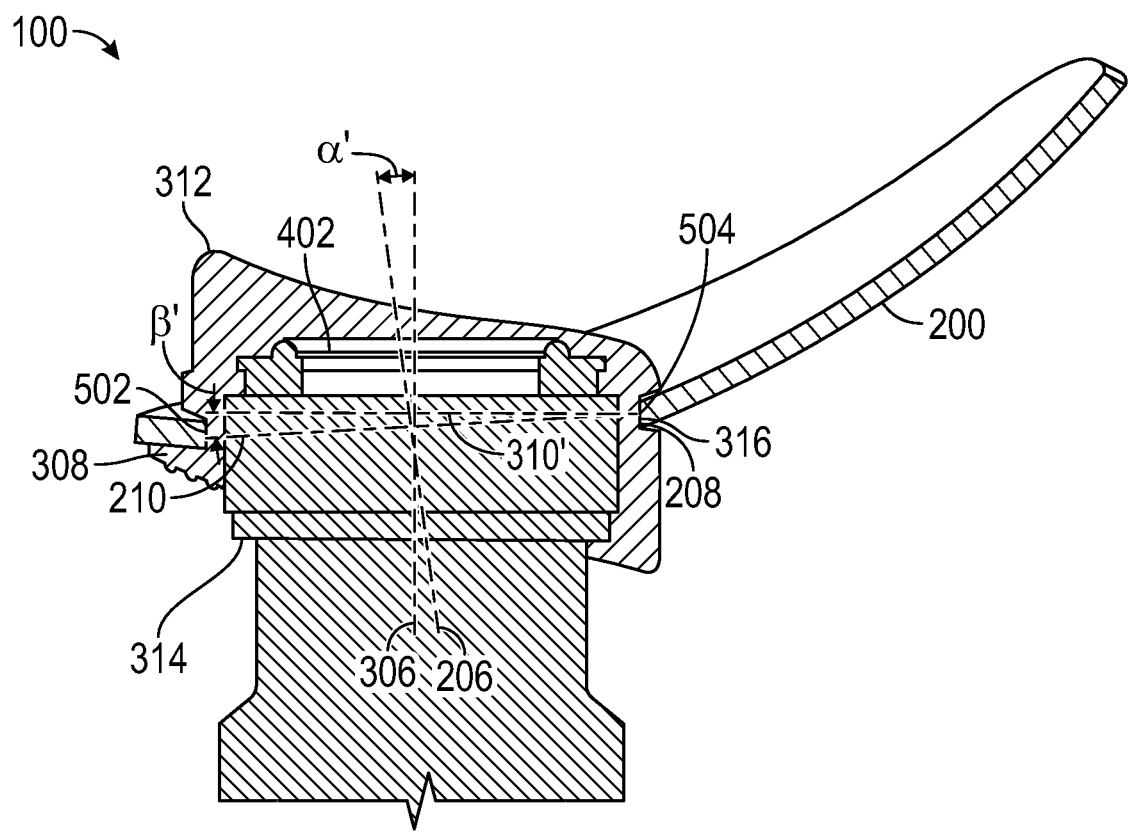
FIG. 12 is an illustration of the gasket and shield of FIG. 1 being removed from the optical device.

Referring to FIG. 12, to remove eye shield 100 from eyepiece 402, the mechanical hold or compression on gasket 300 by shield 200 is released or at least reduced by reducing the tilt of inner diameter 210 of shield 200 relative to eyepiece 402. In other words, eye shield 100 is removable from eyepiece 402 by reducing the tilt of shield 200 relative to eyepiece 402 to increase central diameter 310 (see FIG. 11) to central diameter 310', which may be close or equal to inner diameter 210. Central diameter 310 may be increased to central diameter 310' by pushing and/or adjusting gasket 300 at tab 308 to decrease angle α between second central axis 306 and first central axis 206, and angle β between central diameter 310 and inner diameter 210. For example, gasket 300 may be pushed and/or adjusted via tab 308 such that gasket 300 and shield 200 pivot about contact point 504 and the tilt of inner diameter 210 relative to eyepiece 402 is reduced, thereby decreasing angle α and angle β to angle α' and angle β'. Decreasing angle α and angle β to angle α' and angle β' due to reduction of the tilt of shield 200 results in central diameter 310 increasing to central diameter 310', thereby reducing the mechanical hold of eye shield 100 on eyepiece 402. Central diameter 310 increases to central diameter 310' because the wedge force of shield 200 compressing gasket 300 is decreased by reducing the tilt of inner diameter 210 of shield 200. This results in the central diameter of gasket 300 no longer being compressed, allowing central diameter 310 to increase to central diameter 310', reducing the mechanical hold on eyepiece 402 and allowing easy removable of eye shield 100 from eyepiece 402.

In practice, tab 308 of gasket 300 is pushed towards front end 312, which results in the tilt of inner diameter 210 of shield 200 being reduced and gasket 300 pivoting about contact point 504. This results in angle α and angle β decreasing to angle α' and angle β', allowing gasket 300 and shield 200 to be easily removed from eyepiece 402. In an alternative embodiment, gasket 300 may be pulled and/or adjusted towards rear end 314 such that gasket 300 pivots about contact point 502 to decrease angle α and angle β to angle α' and angle β'. This may also result in central diameter 310 increasing to central diameter 310'. In some embodiments, during or after adjustment of gasket 300, angle α' and angle β' may be greater than or equal to 0°, but may be less than approximately 5°, less than approximately 10°, less than approximately 15°, less than approximately 20°, less than approximately 25°, less than approximately 30°, less than approximately 35°, less than approximately 40°, or less than approximately 45°.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words "proximal", "distal", "upper" and "lower" designate directions in the drawings to which reference is made. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. An eye shield comprising:
a shield including an aperture, the aperture having a first central axis, a medial side, and a lateral side; and
a gasket coupled to the shield and compression fit within the aperture, the gasket having a second central axis, a rear medial end, and a front lateral end,
wherein the first central axis is at an oblique angle relative to the second central axis,
wherein the gasket includes a groove at least partially circumferentially disposed around the gasket and extending from the front lateral end of the gasket to the rear medial end of the gasket,
wherein the medial side and lateral side of the aperture are disposed within the groove such that the front lateral end is closer to the lateral side of the aperture than to the medial side of the aperture and the rear medial end is closer to the medial side of the aperture than to the lateral side of the aperture.

2. The eye shield of claim 1, wherein the gasket includes a tab extending radially from the gasket, the tab disposed proximate to the medial side of the aperture.

3. The eye shield of claim 2, wherein the tab of the gasket is disposed on a rear end of the gasket.

4. The eye shield of claim 2, wherein the tab includes at least one ridge disposed on a surface of the tab.

5. The eye shield of claim 2, wherein the tab is configured to be pushed by a user to move the second central axis toward alignment with the first central axis to remove the gasket from an eyepiece of an optical device.

6. The eye shield of claim 1, wherein the gasket and the shield are composed of different materials.

7. The eye shield of claim 6, wherein the shield is comprised of a resilient plastic.

8. The eye shield of claim 6, wherein the gasket is comprised of an elastomeric material.

9. The eye shield of claim 1, wherein a diameter of the front end and a diameter of the rear end are smaller than a central diameter of the gasket.

10. The eye shield of claim 1, wherein the shield extends further from the lateral side of the aperture than the medial side of the aperture and includes a tapered portion.

11. The eye shield of claim 1, wherein the gasket includes a first side and a second side, the first side being proximate the medial side of the aperture and the second side being proximate the lateral side of the aperture.

12. The eye shield of claim 1, wherein the gasket includes one or more radially projecting and longitudinally extending ribs disposed on a surface of the gasket.

13. The eye shield of claim 1, wherein a portion of the shield that extends from the lateral side of the aperture curves convexly toward the first central axis.

14. The eye shield of claim 1, wherein the shield is optically transparent.

15. The eye shield of claim 1, wherein the gasket extends through both sides of the aperture.

16. The eye shield of claim 1, wherein the gasket is configured to receive an eyepiece of an optical device, the optical device including one of night vision goggles, binoculars, monocular, scopes, spectacles, augmented reality displays, virtual reality displays, display devices, or cameras.

17. The eye shield of claim 1, wherein a diameter of the aperture is greater than all inner diameters of the gasket.

18. The eye shield of claim 2, wherein the tab extends further from the medial side than the lateral side and includes a tapered portion.

19. The eye shield of claim 4, wherein the tab includes a plurality of ridges disposed on a surface of the tab.

20. The eye shield of claim 1, wherein the oblique angle is about 5 degrees to about 30 degrees.

21. The eye shield of claim 20, wherein the oblique angle is about 15 degrees.

22. The eye shield of claim 1, wherein the aperture includes a flat portion such that the aperture is non-circular.

23. An eye shield comprising:
a shield including an aperture, the aperture having a first central axis, a medial side, and a lateral side; and
a gasket coupled to the shield and disposed within the aperture, the gasket having a second central axis, a rear medial end, and a front lateral end,
wherein the first central axis is at an oblique angle relative to the second central axis,
wherein the gasket includes a groove at least partially circumferentially disposed around the gasket and extending from the front lateral end of the gasket to the rear medial end of the gasket,
wherein the medial side and lateral side of the aperture are disposed within the groove such that the front lateral end is closer to the lateral side of the aperture than to the medial side of the aperture and the rear medial end is closer to the medial side of the aperture than to the lateral side of the aperture,
wherein the gasket includes one or more radially projecting and longitudinally extending ribs disposed on a surface of the gasket,
wherein the gasket includes a tab extending radially from the gasket, the tab disposed proximate to the medial side of the aperture and including a plurality of ridges disposed on a surface of the tab.

24. An eye shield comprising:
a shield including an aperture, the aperture having a first central axis, a medial side, and a lateral side; and
a gasket coupled to the shield and disposed within the aperture, the gasket having a second central axis, a rear medial end, and a front lateral end,
wherein the first central axis is at an oblique angle relative to the second central axis,
wherein the gasket includes a groove at least partially circumferentially disposed around the gasket and extending from the front lateral end of the gasket to the rear medial end of the gasket,
wherein the medial side and lateral side of the aperture are disposed within the groove such that the front lateral end is closer to the lateral side of the aperture than to the medial side of the aperture and the rear medial end is closer to the medial side of the aperture than to the lateral side of the aperture,
wherein the gasket includes a tab extending radially from the gasket, the tab disposed on a rear end of the gasket and proximate to the medial side of the aperture.

* * * * *